(12) United States Patent
Hwang et al.

(10) Patent No.: US 10,667,253 B2
(45) Date of Patent: May 26, 2020

(54) SIGNAL TRANSMISSION AND RECEPTION METHOD FOR REDUCING LATENCY IN WIRELESS COMMUNICATION SYSTEM, AND APPARATUS THEREFOR

(71) Applicant: LG ELECTRONICS INC., Seoul (KR)

(72) Inventors: Daesung Hwang, Seoul (KR); Hyunho Lee, Seoul (KR); Hanjun Park, Seoul (KR); Yunjung Yi, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/307,456

(22) PCT Filed: Jun. 8, 2017

(86) PCT No.: PCT/KR2017/005927
§ 371 (c)(1),
(2) Date: Dec. 5, 2018

(87) PCT Pub. No.: WO2017/213421
PCT Pub. Date: Dec. 14, 2017

(65) Prior Publication Data
US 2019/0342864 A1    Nov. 7, 2019

Related U.S. Application Data

(60) Provisional application No. 62/348,149, filed on Jun. 10, 2016, provisional application No. 62/364,339, (Continued)

(51) Int. Cl.
*H04W 72/04* (2009.01)
*H04L 1/18* (2006.01)
(Continued)

(52) U.S. Cl.
CPC ......... *H04W 72/042* (2013.01); *H04L 1/1819* (2013.01); *H04L 5/0055* (2013.01);
(Continued)

(58) Field of Classification Search
CPC ... H04L 1/1819; H04L 5/0055; H04L 5/0082; H04W 72/042; H04W 72/0446; H04W 88/02
See application file for complete search history.

(56) References Cited

U.S. PATENT DOCUMENTS

| 2012/0113869 A1 | 5/2012 | Gaal et al. |
| 2014/0050191 A1 | 2/2014 | Kim et al. |

(Continued)

FOREIGN PATENT DOCUMENTS

WO    WO-2017133212 A1 *  8/2017    ........ H04W 72/0446

OTHER PUBLICATIONS

PCT International Application No. PCT/KR2017/005927, Written Opinion of the International Searching Authority dated Sep. 13, 2017, 13 pages.

(Continued)

*Primary Examiner* — Benjamin H Elliott, IV
(74) *Attorney, Agent, or Firm* — Lee Hong Degerman Kang Waimey

(57) ABSTRACT

Disclosed is a method for transmitting an uplink signal to a base station by a terminal in a wireless communication system. Specifically, the method comprises the steps of: detecting a downlink control signal from the base station through a terminal-specific search space or a common search space at a first time point; and transmitting an uplink signal corresponding to the downlink control signal to the base station on the basis of the downlink control signal, wherein, when the downlink control signal is detected in the terminal-specific search space, the uplink signal is transmitted at a (Continued)

second time point, and when the downlink control signal is detected in the common search space, the uplink signal is transmitted at a third time point.

6 Claims, 8 Drawing Sheets

Related U.S. Application Data filed on Jul. 20, 2016, provisional application No. 62/374,011, filed on Aug. 12, 2016, provisional application No. 62/378,652, filed on Aug. 23, 2016, provisional application No. 62/398,497, filed on Sep. 22, 2016, provisional application No. 62/454,005, filed on Feb. 2, 2017.

(51) Int. Cl.
 *H04L 5/00* (2006.01)
 *H04W 88/02* (2009.01)
(52) U.S. Cl.
 CPC ....... *H04L 5/0082* (2013.01); *H04W 72/0446* (2013.01); *H04W 88/02* (2013.01)

(56) References Cited

U.S. PATENT DOCUMENTS

| | | | |
|---|---|---|---|
| 2014/0177582 A1* | 6/2014 | Wu | H04L 5/0037 370/329 |
| 2014/0301343 A1* | 10/2014 | Park | H04L 5/0053 370/329 |
| 2015/0365214 A1 | 12/2015 | Ann et al. | |
| 2016/0345311 A1* | 11/2016 | Chen | H04L 5/00 |
| 2017/0223670 A1* | 8/2017 | Chen | H04L 5/0053 |
| 2017/0273071 A1* | 9/2017 | Nogami | H04W 72/0413 |
| 2017/0290008 A1* | 10/2017 | Tooher | H04L 1/0007 |
| 2018/0213530 A1* | 7/2018 | Mochizuki | H04W 72/12 |
| 2018/0343667 A1* | 11/2018 | Li | H04W 72/0446 |
| 2019/0037565 A1* | 1/2019 | Zheng | H04W 72/0446 |
| 2019/0045527 A1* | 2/2019 | Shimezawa | H04W 28/04 |
| 2019/0342864 A1* | 11/2019 | Hwang | H04W 88/02 |

OTHER PUBLICATIONS

LG Electronics, "Discussions on DCI sPDCCH for latency reduction", 3GPP TSG RAN WG1 Meeting #85, R1-164542, May 2016, 8 pages.
NTT DOCOMO, "Discussion on frame structure for NR", 3GPP TSG RAN WG1 Meeting #85, R1-165176, May 2016, 12 pages.

\* cited by examiner

-- Prior Art --

(A) CONTROL-PLANE PROTOCOL STACK (B) USER-PLANE PROTOCOL STACK

SIGNAL TRANSMISSION AND RECEPTION METHOD FOR REDUCING LATENCY IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2017/005927, filed on Jun. 8, 2017, which claims the benefit of U.S. Provisional Application No. 62/348,149, filed on Jun. 10, 2016, 62/364,339, filed on Jul. 20, 2016, 62/374,011, filed on Aug. 12, 2016, 62/378,652, filed on Aug. 23, 2016, 62/398,497, filed on Sep. 22, 2016, and 62/454,005, filed on Feb. 2, 2017, the contents of which are all hereby incorporated by reference herein in their entirety.

TECHNICAL FIELD

The present invention relates to a wireless communication system, and more particularly, to a signal transmission and reception method for reducing latency in a wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

Based on the aforementioned discussion, an object of the present invention is to provide a signal transmission and reception method for reducing latency in a wireless communication system and an apparatus therefor.

Technical Solution

A method for transmitting an uplink signal to a base station (BS) by a user equipment (UE) in a wireless communication system according to the embodiment of the present invention comprises the steps of detecting a downlink control signal from a UE specific search space or a common search space at a first instance; and transmitting an uplink signal based on the downlink control signal to the BS, wherein, if the downlink control signal is detected from the UE specific search space, the uplink signal is transmitted at a second instance, wherein, if the downlink control signal is detected from the common search space, the uplink signal is transmitted at a third instance.

Meanwhile, a user equipment (UE) in a wireless communication system according to the embodiment of the present invention comprises a wireless communication unit configured to transmit and receive signals with a base station (BS); and a processor configured to process the signals, wherein the processor is configured to: detect a downlink control signal from a UE specific search space or a common search space at a first instance; and transmit an uplink signal based on the downlink control signal to the BS, wherein, if the downlink control signal is detected from the UE specific search space, the processor transmits the uplink signal at a second instance, wherein, if the downlink control signal is detected from the common search space, the processor transmits the uplink signal at a third instance.

In detail, the uplink signal is a response signal of a downlink data signal scheduled by the downlink control signal or an uplink data signal scheduled by the downlink control signal.

Preferably, the second instance is after the first instance and before the third instance. Particularly, the third instance is 4 Transmission Time Intervals (TTIs) after the first instance.

Characteristically, if the uplink signal is a response signal of a downlink data signal scheduled by the downlink control signal, a resource for transmitting the response signal at the second instance and a resource for transmitting the response signal at the third instance are determined based on difference offsets.

Advantageous Effects

According to the embodiment of the present invention, a UE and a base station may efficiently transmit and receive a signal under a shortened TTI to reduce latency.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
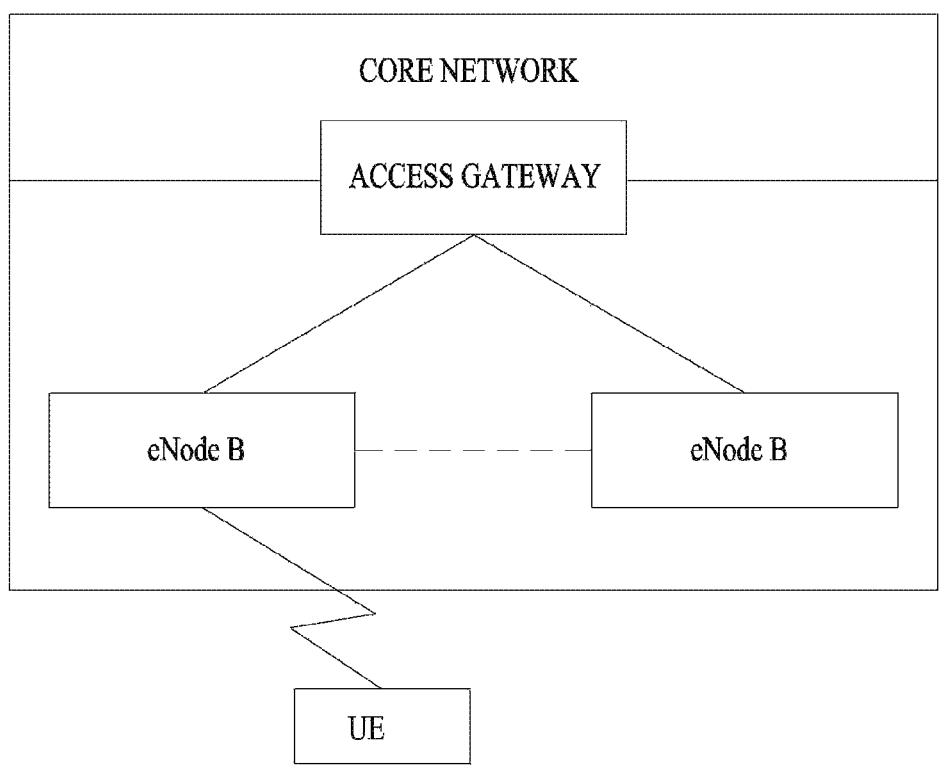
FIG. 1 is a diagram schematically illustrating a network structure of an E-UMTS as an exemplary radio communication system.
Figure 2:
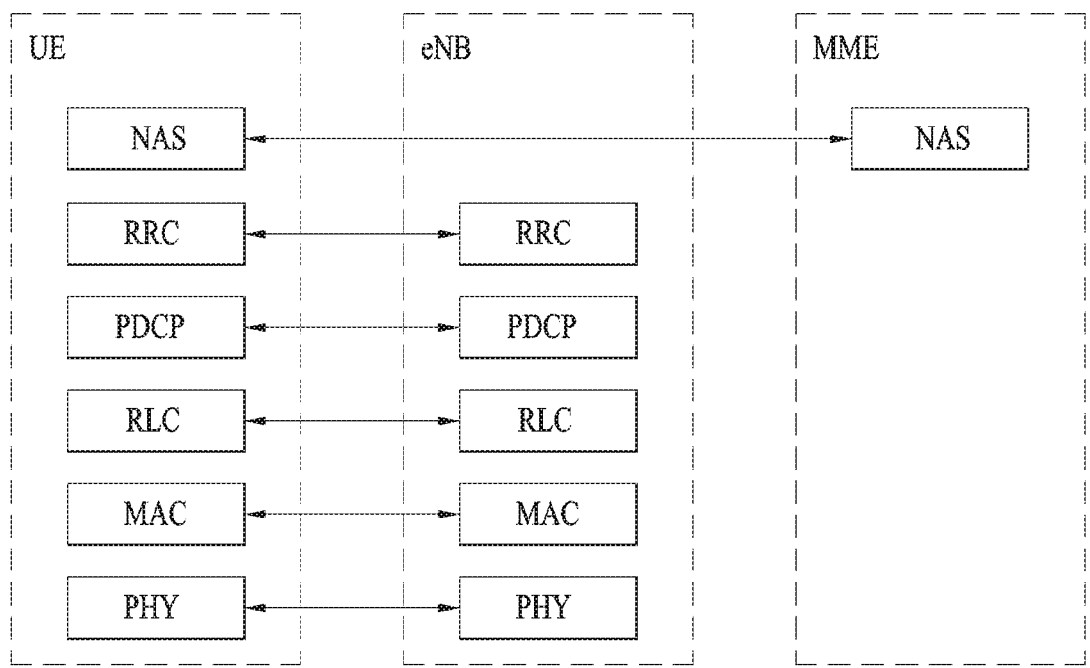
FIG. 2 is a diagram illustrating structures of a control plane and a user plane of a radio interface protocol between a UE and an E-UTRAN based on the 3GPP radio access network specification.
Figure 2:
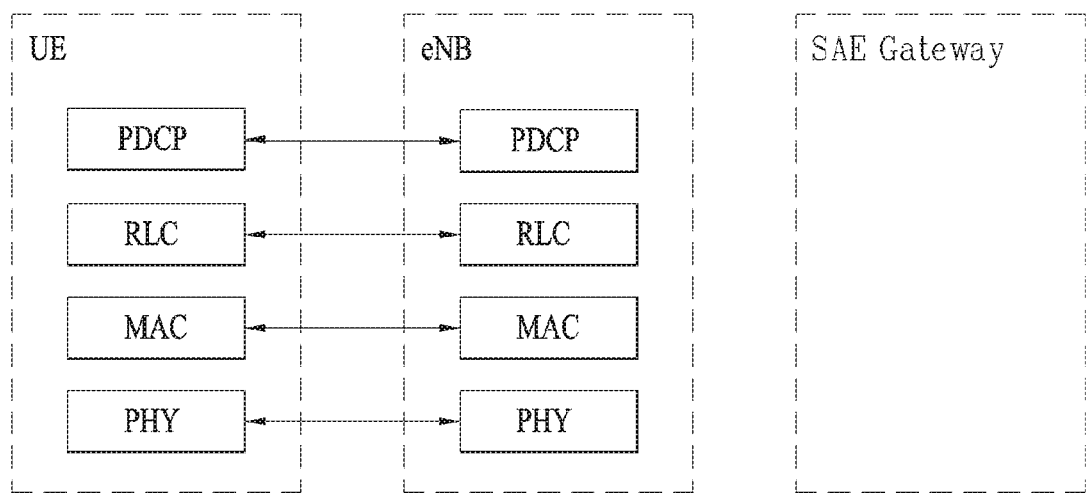

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
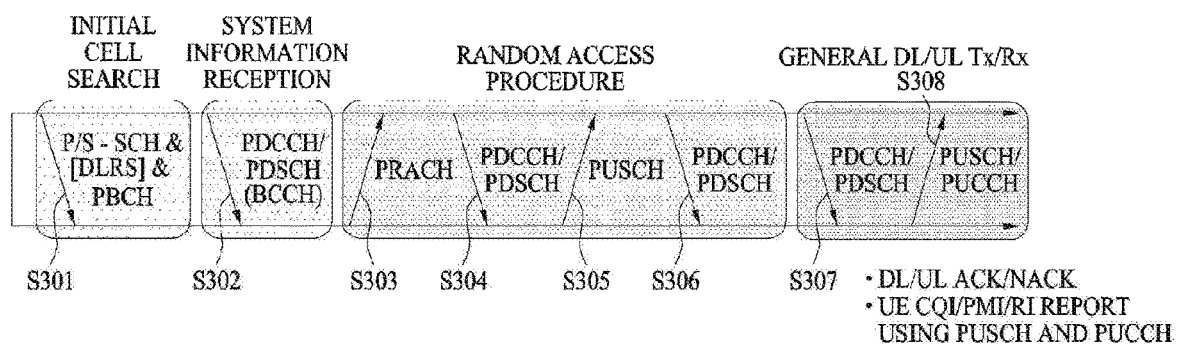
FIG. 3 is a diagram illustrating physical channels used in a 3GPP system and a general signal transmission method using the same.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
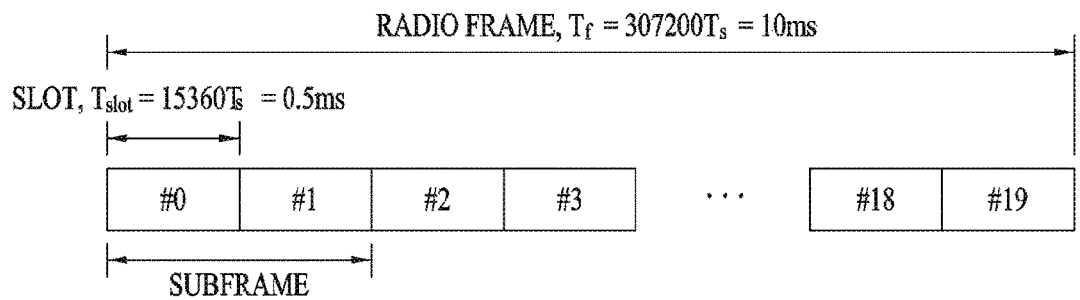
FIG. 4 is a diagram illustrating the structure of a radio frame used in an LTE system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ kHz\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
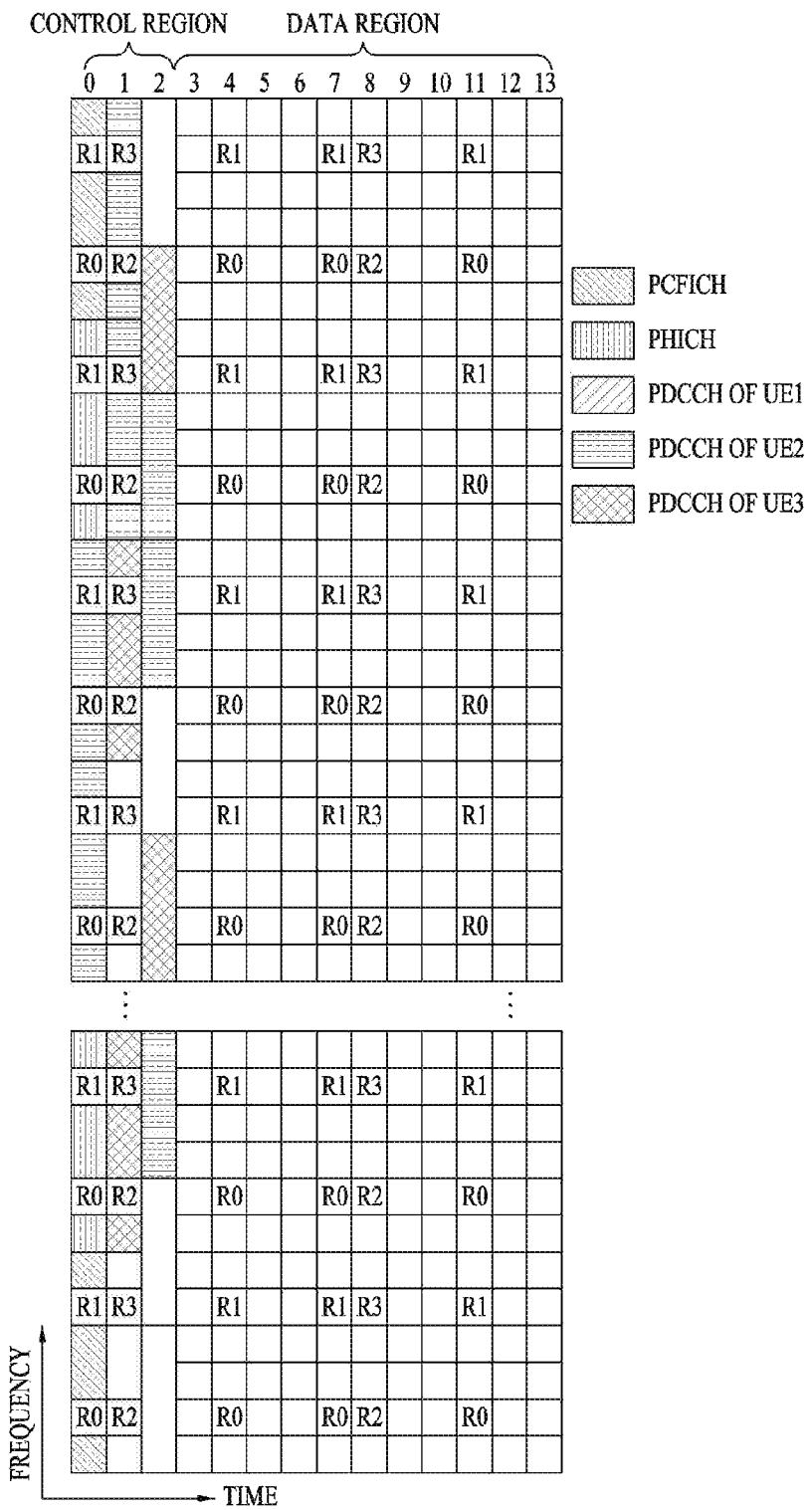
FIG. 5 is a diagram illustrating the structure of a DL radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPS K). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
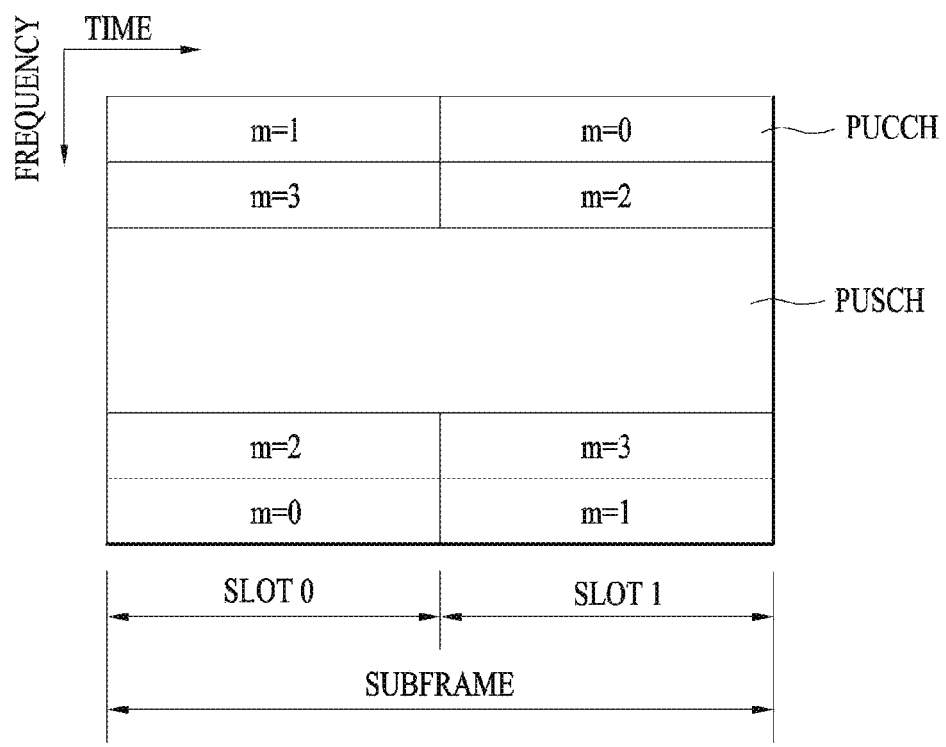
FIG. 6 is a diagram illustrating the structure of a UL subframe in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

To satisfy requirements for a variety of application fields, a status in which various transmission time intervals (TTIs) may be configured for all physical channels or specific physical channels is under discussion in a future-generation wireless communication system. Particularly, a setup of a TTI for transmission of a physical channel such as PDCCH/PDSCH/PUSCH/PUCCH to be shorter than 1 msec is considered in order to reduce latency during communication between an eNB and a UE. Hereinafter, a physical channel operated at a TTI shorter than 1 msec is referred to as sPDCCH/sPDSCH/sPUSCH/sPUCCH). With respect to a single UE or a plurality of UEs, a plurality of physical channels may exist within a single subframe (e.g., 1 msec), and a TTI for each physical channel may be configured independently.

The following description is given in the context of an LTE system, for convenience of description. In the present invention, a TTI includes a normal TTI of 1 msec which is a general subframe size and a shortened TTI (hereinafter, S-TTI) shorter than 1 msec, and may be a unit of one/a plurality of OFDM symbols or SC-FDMA symbols. While a shortened TTI is assumed for convenience of description, the present invention may also be extended to a case that the TTI is longer than the size of a subframe or equal to or longer than 1 ms. Further, it is apparent that the spirits of the present invention are also applicable to a system (e.g., New RAT) other than LTE. Particularly, a shortened TTI may be introduced in such a manner that a subcarrier spacing is increased in the future-generation wireless communication system. In the present disclosure, it is assumed that S-TTI (<1 msec), a normal TTI (=1 msec), and L-TTI (>1 msec) exist as TTI.

In accordance with the introduction of S-TTI, throughput increment gain and latency reduction gain may be achieved. This may be acquired by reduction of downlink reception based uplink transmission timing and/or reduction of uplink transmission based downlink reception timing. In this case, the downlink reception based uplink transmission timing refers to a timing when corresponding HARQ-ACK is transmitted after sPDCCH/sPDSCH is transmitted, a timing when corresponding sPUSCH is transmitted after an uplink grant is transmitted, or the like. Also, the uplink transmission based downlink reception timing refers to a timing when corresponding ACK/NACK or retransmission information is transmitted after sPUSCH is transmitted, a timing when sPDCCH is transmitted after sPUCCH is transmitted, or the like.

Reduction of the downlink reception based uplink transmission timing and reduction of the uplink transmission based downlink reception timing may be implemented by reduction of the time used for actual channel transmission in accordance with the introduction of S-TTI, reduction of data encoding/decoding processing time according to reduction of a transport block size (TBS), reduction of the time required for channel measurement, reduction of the entire encoding/decoding processing time including blind detection for DCI, reduction of the time when scheduling is performed, and reduction of a time duration required for TA.

More characteristically, in the future generation wireless communication system, (maximum) TBS and (maximum) TA values may be set independently in accordance with reduction (that is, reduction of symbols constituting TTI and/or increase of subcarrier spacing) of TTI length. Particularly, (maximum) TA may be set differently depending on the subcarrier spacing. This is because that the number of symbols affected by the TA value may be changed.

Also, reduction of the processing time even at normal TTI (e.g., 1 ms) based on the legacy LTE may be considered. In this case, (maximum) TBS and/or (maximum) TA values may be set in an upper layer. Characteristically, the (maximum) TA value may be equal to the (maximum) TA value for one slot TTI (that is, TTI configured by 7 symbols), or may be set to $4096 \times T_s$ (in this case, $T_s$ is a sampling time and may be $1/(15 \text{ kHz} \times 2048) = 3.2552 \times 10^{-8}$ (about 33 ns)) with reference to a value supported by dual connectivity.

More characteristically, in case of a normal TTI of 1 ms, considering coexistence between UEs operating at a shortened processing time, the legacy general timing (e.g., 4 ms based on FDD system), a maximum TA value (e.g., $20512 \times T_s$) and a maximum TBS may be applied to a specific channel without applying the shortened processing time. In more detail, the specific channel to which the shortened processing time is not applied may correspond a cell-specific procedure or a cell-specific channel, and the shortened processing time operation may not be applied to (E)PDCCH and/or PDSCH transmission corresponding to SI-RNTI and/or P-RNTI and/or RA-RNTI and/or Temporary C-RNTI.

Also, minimum processing time and maximum TBS supported by each UE may be different. The minimum processing time determined by the UE may be a downlink reception based uplink transmission timing (or uplink transmission based downlink reception timing), or may be a general data decoding/encoding time. Generally, delay generated during data decoding/encoding may mean the time from the time when data transmission ends to the time data decoding or encoding ends, and may transmit UE capability information on several sets of {maximum TBS, decoding latency} to each UE.

Alternatively, with respect to the downlink reception based uplink transmission timing, UE capability information on downlink reception based uplink transmission minimum timing for HARQ-ACK transmission and PUSCH transmission timing may be transmitted to several TBS candidate values.

If this UE capability information is introduced, this may be assumed as a value for processing immediately from the time when transmission ends, regardless of numerology used for transmission or transmission time, and the downlink reception based uplink transmission minimum timing actually assumed in accordance with data interleaving or time/frequency resource mapping may be set to be shorter than UE capability or latency reported by the UE.

Also, it is assumed by the UE capability information that processing for a control channel ends prior to the time when data transmission ends. This may give a restriction for the minimum data transmission time that should be minimum data transmission. For example, if 0.1 msec is required for control channel decoding, and if the data transmission time is shorter than 0.1 msec, the time when decoding of corresponding data can start may be an end timing point of control channel decoding.

Meanwhile, since UE capability and UE support capability for a processing time may be determined in accordance with a numerology which is used, UE capability signaling in the form of {maximum TB S, processing time, numerology} may be considered. Also, since UE capability and UE support capability may be affected by a layer which is configured, it is required that a necessary transmission scheme should be assumed. For example, a minimum processing time may be signaled on the assumption of the simplest 1 layer transmission and RS transmission for channel measurement is performed at the front of data transmission, and when the other transmission schemes are used, the possibility that the processing time may be increased may be considered. Also, it is assumed that a TA value assumed for the processing time is 0 or a fixed value (or may have another value depending on TTI length).

Based on the aforementioned description, the method for reducing the processing time will be described. In determining the processing time for a random TBS T, a reference processing time may be assumed as a processing time of the smallest one of maximum TBSs (>=T) reported by the UE. For example, if one UE reports UE capability information as {5000 bits, 0.6 msec}, {10000 bits, 1 msec}, calculation for TBS of 4000 bits is performed based on 0.6 msec.

Also, when UE capability is signaling, the minimum downlink reception based uplink transmission timing for each TTI length may be signaled by the UE. This type of UE capability information may be defined in the form of {TTI length, maximum TBS, minimum downlink reception based uplink transmission timing}.

If this UE capability information signaling is introduced or the processing time of the UE or the minimum downlink reception based uplink transmission timing is determined in respect of a TTI length, it may be assumed that the following case is supported.

{TTI length=m msec, max TBS=T, min_RTT or min_Tx_timing=k TTI}, {TTI length=m*k msec, max_TBS=T, min_RTT or min_Tx_timing=0 TTI}

In this case, if min_Tx_timing, that is, the minimum downlink reception based uplink transmission timing is 0, it means that corresponding HARQ-ACK or PUSCH may be transmitted within a TTI in which corresponding PDSCH and uplink grant are transmitted. Characteristically, in the above case, a time duration for which a physical channel is actually transmitted may be shorter than a TTI length.

For example, it is assumed that the UE may process A/N transmission at 3 TTI (that is, k=3) by processing 3000 bits within 1/7 msec (that is, 2 symbols at a subcarrier spacing of 15 kHz). This case means that A/N for 3000 bits within 1/2 msec (1 slot at a subcarrier spacing of 15 KHz) may be transmitted within the corresponding TTI. However, in case of S-TTI of 7-symbol length, since the number of symbols corresponding to the time when A/N can be transmitted is 1, a transmission spacing or burst of A/N transmission may be different for two cases. This is a problem in view of processing, and means that the minimum downlink reception based uplink transmission timing when the UE can perform transmission may be determined regardless of the value of TTI if a transmission time and a processing time are satisfied.

A similar concept may be applied to the minimum uplink transmission based downlink reception timing.

The aforementioned suggestion is applicable to even the case that the processing time or minimum RTT is implicitly determined in accordance with a maximum TBS per TTI size without transmitting UE capability information. This means that minimum RTT may be changed depending on a TTI length which is configured, and also means that minimum RTT may be changed additionally by (maximum) TBS dynamically or statically. That is, the UE may configure S-TTI length, UE capability per TBS or minimum RTT with respect to all UEs (that is, UEs which support S-TTI procedure or supports a specific scenario, for example, URLCC) instead of transmitting capability information, and may dynamically manage them.

Also, if the minimum RTT is commonly configured for UEs (which support S-TTI procedure or support a specific scenario, for example URLLC), and if a UE is superior to corresponding capability or has latency, delta of latency may be indicated through additional signaling.

In the future-generation wireless communication system, it may be considered that a transmission timing is configured independently based on a TTI length only. Alternatively, it may be considered that a transmission timing may be subdivided and configured differently depending on a status and/or UE even though the TTI length is constant. For example, TA value and/or TBS value may be set differently per UE, and in this case, a timing of a channel (for example, corresponding HARQ-ACK after sPDSCH or sPUSCH after uplink grant) transmitted after each processing time is determined differently per UE may be configured differently per UE or status (for example, in the form indicated by DCI).

Also, a minimum processing time for a specific UE may be configured based on a main TA (for example, 67 us or 0.33 ms). The corresponding minimum processing time may be provided to the eNB in the form of UE capability signaling, and may be configured for the UE by the eNB through higher layer signaling and/or DCI. The TA value for the UE may not be a fixed value, and if the TA value is increased (or reduced) as much as N symbol duration or M S-TTI from the main TA, the minimum processing time may be increased (or reduced) as much as a corresponding duration, that is, N symbols or M S-TTI.

Alternatively, each minimum processing time/maximum processing time for a plurality of main TAs may be defined previously or configured through a higher layer signal, and a rule may be defined such that a minimum processing time/maximum processing time may be determined without separate signaling in accordance with the TA value configured for the UE. If the processing time indicated through higher layer signaling and/or DCI is not a value within the range of the minimum processing time and the maximum processing time, the UE may assume a specific processing time (for example, maximum processing time) or determine that corresponding scheduling is invalid. In this case, the UE may skip reception and/or transmission according to the corresponding scheduling.

For convenience of description, it is assumed that a length of S-TTI is set to 1/7 msec, 0.25 msec, or 0.5 msec. Also, it is assumed that a length of S-TTI to which the UE applies the corresponding invention is designated through dynamic signaling or semi-static signaling.

Hereinafter, transmission timing setup according to S-TTI will be described in detail.

Basically, the number of total REs used to transmit data during TTI shortening (that is, a procedure of reducing a time duration for which a physical channel is transmitted) may be reduced. For example, if the number of OFDM symbols which belong to one TTI duration is reduced in a state that a numerology is maintained, the number of total REs may be reduced. Alternatively, if scaling is performed for a numerology but a bandwidth is fixed to reduce resources which belong to the corresponding bandwidth and the number of symbols which belong to one TTI is maintained like the legacy case, the number of total REs may be reduced.

Therefore, a restriction for a maximum TBS during TTI shortening is essentially required. Since complexity of (turbo) decoding/encoding is proportional to a code block size and/or the number of code blocks (that is, TBS), the processing time may be reduced in accordance with TBS reduction. Reduction of the processing time may again reduce a transmission timing. In accordance with a TA value, it may be considered that the transmission timing is changed in case of downlink reception based uplink transmission timing. And/or the transmission timing may be changed even based on a specific field value of DCI.

In more detail, the UE may perform CSI measurement in accordance with a CSI request field value, and the downlink reception based uplink transmission timing may be increased due to (potential) increase of the processing time according to the corresponding procedure. Characteristically, the downlink reception based uplink transmission timing may be changed depending on a TTI length for a DCI container which includes an uplink grant, for example, TTI length for sPDCCH, and/or a TTI length for sPUSCH, and/or CSI contents. For example, if the TTI length for sPDCCH/sPUSCH is short like 2 S-TTI or 4 S-TTI, an increase level of the downlink reception based uplink transmission timing in the case that a CSI request is triggered may be different from the case that the CSI request is not triggered. Also, the increase level of the downlink reception based uplink transmission timing may be changed depending on a CSI reporting type or contents (or processing information) (for example, wideband CSI reporting, sub-band CSI reporting) or CSI reporting amount. For example, in case of subband CSI reporting, the downlink reception based uplink transmission timing may be set to be (previously) longer than the case that wideband CSI reporting is performed/reported.

The change of the downlink reception based uplink transmission timing may mean that timing is applied by S-TTI or the legacy TTI. For example, if type A and type B exist as CSI processing types or CSI reporting types, timing may be applied in accordance with S-TTI when the type A is configured dynamically or semi-statically, or timing may be applied in accordance with the legacy TTI when the type B is configured. In other words, it may mean that the type A may only be configured to use S-TTI. Alternatively, the transmission timing and the TTI length may be determined in accordance with a type.

Even in the case that the downlink reception based uplink transmission timing is configured dynamically or statically, whether a unit of this timing value is based on S-TTI or the legacy TTI or whether the unit of this timing value is applied based on S-TTI1 and S-TTI2 may be applied differently depending on the above examples such as CSI reporting type.

Also, the transmission timing may be changed depending on a transmission format (for example, a structure that sPDCCH and sPDSCH are subjected to TDM together with PDCCH or a structure that sPDCCH and sPDSCH are subjected to FDM together with EPDCCH) of sPDCCH to which DCI is transmitted. In detail, in the structure that sPDCCH and the corresponding sPDSCH are subjected to FDM together with EPDCCH, the timing when detection/decoding for sPDCCH starts may be different from (in more detail, later than) the structure that sPDCCH and the corresponding sPDSCH are subjected to TDM together with PDCCH. That is, time may be required additionally in view of the entire transmission timing Therefore, in this case, it may be considered that additional latency is introduced. For example, in the structure that sPDCCH and the corresponding sPDSCH are subjected to FDM, the data processing time as much as X S-TTI may be added as compared with the structure that sPDCCH and the corresponding sPDSCH are subjected to TDM.

Characteristically, if the operation for reducing the processing time is configured at TTI of 1 ms, the legacy timing (e.g., timing of 4 ms) may be used if PDSCH is scheduled by EPDCCH, and a reduced timing (e.g., timing less than 4 ms) may be used in accordance with a configuration if PDSCH is scheduled by PDCCH. In another way, if (s)PDSCH is scheduled by EPDCCH or sPDCCH in a structure of EPDCCH, a restriction for a TBS (e.g., maximum TBS restriction or available TBS restriction) may be considered. And/or the UE may skip decoding for all or some of coding blocks with respect to a reception PDSCH.

Characteristically, a shortened processing time operation may be configured for a 1 ms TTI by a higher layer, and a data processing time (or data processing range) may be changed depending on the corresponding configuration. However, a general timing (e.g., timing of 4 ms) may be used for (E)PDCCH/PDSCH corresponding to P-RNTI and/or Temporary C-RNTI and/or SI-RNTI, or a channel corresponding to a fallback operation, for example, DCI format 1A, even in case that the shortened processing time operation is configured through higher layer signaling.

In still another way, the shortened processing time may not be configured for a specific TM. Whether the shortened processing time is applied may be configured for a specific channel. In more detail, in case of (s)PDSCH and scheduled by DCI format 1A and/or (s)PUSCH scheduled by DCI format 0 corresponding to CSS, the shortened processing time may not be applied to the corresponding channel even in the case that the shortened processing time operation is configured. In this case, in case of FDD, downlink HARQ-ACK feedback may be transmitted at subframe # n+4 after PDSCH scheduled by DCI format 1A transmitted at subframe # n. If an uplink grant transmitted at subframe # n corresponds to CSS, PUSCH corresponding to CSS may be transmitted at subframe # n+4.

If the shortened processing time is applied, RNTI used for CRC masking and/or scrambling sequence applied to (E)PDCCH and/or PDSCH and/or PUSCH may be configured separately from C-RNTI. (Hereinafter, the RNTI which is configured separately is referred to as C-RNTI_ST.) Alternatively, additional offset may be used when the shortened processing time operation is applied when scrambling sequence and/or CRC masking is generated.

Characteristically, to prevent blind detection at the UE end from being additionally performed, when the shortened processing time operation is applied for CRC masking, the third RNTI may be used or additional offset in addition to C-RNTI may be used. Also, as a part for preventing blind detection from being additionally performed, it may be considered that padding bits are added such that DCI size for the case that the shortened processing time operation is not applied may be equal to DCI size for the case that the shortened processing time operation is applied. The padding bits may be sequences comprised of mode 0, or may be set to sequences signaled by a higher layer. More characteristically, the DCI sizes may be set to be equal to each other in accordance with the shortened processing time setup if the corresponding DCI corresponds to UE-specific Search Space (USS). In this case, whether to apply the shortened processing time may be determined in accordance with RNTI or scrambling and/or CRC masking.

In addition, it may be considered that the transmission timing may be changed depending on a change of blind detection attempt times for sPDCCH, restriction in a channel estimation method, etc. However, in the embodiment of the present invention, a transmission timing configuration method according to TB S and/or TA is considered for convenience of description. The followings are detailed examples of the transmission timing configuration method.

First Example

Later transmission timing is configured in accordance with a TTI length and/or MCS field within DCI and/or RA field value. That is, the transmission timing means HARQ-ACK transmission timing of corresponding sPDSCH in case of DCI for downlink (DL) assignment, and means corresponding sPUSCH transmission timing in case of DCI for an uplink grant.

Characteristically, later transmission timing may be configured based on TBS configured in accordance with MCS field and/or allocated RB and/or TTI length. The timing value may be set previously per TBS or MCS (or based on maximum TA value configured previously or by a higher layer), or the transmission timing may be configured previously per TBS or MCS (duration) considering a TA value, etc. The transmission timing may be applied by being calculated at each of eNB and UE ends, or may be calculated at the UE end and then the corresponding value or a candidate value (area) for the corresponding calculation may be transmitted to the eNB in the form of UE capability signaling, whereby the value may be selected by the eNB and then signaled to the UE.

Second Example

A main value for later transmission timing is set in accordance with a TTI length and/or MCS field within DCI and/or RA field value. More characteristically, the main value may be a minimum value for the transmission timing. Additionally, a final main value may be set considering a maximum TA value or a current TA value and/or a TBS-independent part, for example, channel measurement.

For example, the actual transmission timing may be configured dynamically through DCI, and may configure a transmission method differently depending on a relation between a minimum value set in accordance with MCS and/or RA value (TB S) and a set timing. If the set timing is longer than a minimum timing value set in accordance with MCS/RA, later transmission may be performed along the set timing. If the set timing is shorter than a minimum timing set in accordance with MCS/RA/TA, corresponding transmission may be cancelled or dropped (that is, HARQ-ACK is dropped after sPDSCH transmission), or later transmission may be performed in accordance with a minimum timing. In another way, if the set timing is shorter than a minimum timing which is set in accordance with MCS, RA and/or TA or is feasible, it may be considered that the UE may skip decoding for sPDSCH (in the middle of decoding). In this case, HARQ-ACK for sPDSCH may be set to NACK, or may not be transmitted. On the other hand, in case of sPUSCH, the UE may skip sPUSCH transmission.

The main value for the transmission timing may be applied by being respectively calculated at the eNB and UE ends, or may be calculated at the UE end and then the corresponding value or a candidate value (area) for the corresponding calculation may be transmitted to the eNB in the form of UE capability signaling, whereby the value may be selected by the eNB and then signaled to the UE.

Third Example

A range value for later transmission timing is set in accordance with a TTI length and/or MCS field within DCI and/or RA field value. The range value may be set previously, or may be set by a higher layer. Afterwards, a final transmission timing may be configured in the form of indicating a specific value within a given range in DCI. That is, the transmission timing may be devised/configured by combination of a timing related indication field value within DCI and MCS field and/or RA field value.

The range value for the transmission timing may be calculated by the eNB and signaled to the UE, or may be calculated at the UE end and then a candidate value (area) may be transmitted to the eNB in the form of UE capability signaling, whereby the value may be selected by the eNB and then signaled to the UE.

In the above case, the TTI length may be for sPDCCH/sPDSCH/sPUCCH/sPUSCH, or may be a maximum or minimum value of a TTI length for a downlink and a TTI length for an uplink. Alternatively, the TTI length may be considered for a downlink and an uplink. If a TTI end time and a transmission end time of a physical channel are different from each other, the time when transmission of a previous channel ends within a TTI may additionally be considered.

The transmission timing (downlink-uplink timing and/or uplink-downlink timing) may have a default value of K, and if the timing is dynamically indicated by DCI, offset for a corresponding default value may be notified. Characteristically, the default value may be considered after four TTIs (that is, corresponding HARQ-ACK is transmitted at TTI # n+4 after sPDSCH is transmitted at TTI # n). This default value of k may be determined by UE capability signaling of the UE. It will be apparent that the above method is applicable to PDSCH, PUSCH and PUCCH, of which processing time is reduced, in addition to sPDSCH, sPUSCH and sPUCCH.

More characteristically, in case of downlink reception based uplink transmission timing, a value or range of the transmission timing may be changed depending on a specific field value (e.g., CSI request) of DCI. Alternatively, the transmission timing (range) may be calculated/configured in accordance with a specific field value of DCI, and a final transmission timing (range) may be selected in accordance with the corresponding field value at the time when DCI is detected. Also, if CSI is triggered, the time required to transmit PUSCH from an uplink grant may be changed, based on max {uplink preparation delay, CSI processing delay}, from the case that CSI is not triggered. That is, a minimum duration from the uplink grant to the PUSCH transmission may be determined depending on a condition of CSI trigger. This timing may be configured by the network through DCI.

In another way, it may be considered that TBS or TA value is restricted/changed depending on a specific field value of DCI. Alternatively, the downlink reception based uplink transmission timing may not exist for CSI request. In this case, it may be considered that CSI update is varied depending on TTI length for sPDCCH/sPDSCH and/or CSI contents (for example, wideband CSI, subband CSI) or CSI reporting amount.

For example, for the case that the TTI length is set to be short (for example, 2), if all or some of CSI measurements are not sufficient temporally at the time when sPUSCH is transmitted, transmission for some specific CSI reports may be skipped or a previously updated value therefor may be transmitted. Alternatively, this case may correspond to the case that sPUSCH has been triggered but its reporting type is not supported for transmission of S-TTI. This may mean that a CSI reporting type may be changed depending on each S-TTI length or sPUSCH length or S-TTI of a transmission cycle of sPDCCH.

Alternatively, if wideband CSI is reported, an updated value is transmitted to sPUSCH, and if subband CSI is reported, transmission for all or some of CSI reports may be skipped or a previously updated value therefor may be transmitted.

If the processing time cannot be changed depending CSI triggering, to reduce processing time budget, the UE may solve CSI as follows.

- Since the processing time is not sufficient even in case of aperiodic CSI triggering, CSI feedback corresponding to periodic CSI is transmitted.
- If the UE cannot process CSI, the UE allows transmission of previous CSI.
- If the UE cannot process CSI, the UE transmits invalid CSI.
- Simplified short-term aperiodic CSI triggering method is defined.
- More characteristically, a reference for skipping or updating the CSI reporting transmission may be applied to even the case that the downlink reception based uplink transmission timing is changed depending on the presence of CSI request/CSI reporting. In this case, the downlink reception based uplink transmission timing may be applied when a final downlink reception based uplink transmission timing considering the CSI request exceeds a specific threshold value (set by a higher layer).

It may be considered that a plurality of HARQ-ACKs are configured for a single sPDSCH within a specific TTI (for example, HARQ-ACK is generated per code block (group) and then transmitted) or sPDSCH is transmitted within some time domain only using puncturing/rate-matching within a TTI. In this case, the time when processing starts after downlink reception may be moved up prior to sPDSCH transmission for all time domains within the TTI.

For example, in a state that sPDSCH is transmitted for 7 symbols within a TTI comprised of 7 symbols, if the processing time starts after the time when the TTI ends, processing may start from a TTI middle point (after time duration when sPDSCH or sPDCCH is actually transmitted) in case of sPDSCH (or PDCCH) transmission for 2 symbols within the TTI. In this case, the downlink reception based uplink transmission timing may be reduced as much as at least the corresponding duration. In this case, it may be considered in the first example to the third example that the TTI length may be replaced with the time when sPDSCH transmission ends.

For another example, with respect to a specific TTI length, processing cannot start from the TTI end time. sPDCCH is transmitted within one symbol at a TTI comprised of 2 symbols and sPDSCH is transmitted from the other area, wherein processing for sPDSCH may also start after a specific time from the end time of sPDSCH transmission if decoding for sPDCCH ends after sPDSCH transmission ends. In this case, the time when sPDCCH blind detection attempt ends may be considered additionally.

More generally, sPDSCH decoding may start from the later timing of the timing when sPDCCH blind detection attempt ends and the sPDSCH transmission end timing. Therefore, the above timing may be considered even during the transmission timing configuration. Although other processing time (for example, channel measurement) is not mentioned, it may be considered that the above timing may be included in the other processing time mentioned herein.

Characteristically, it is preferable that the processing time for the sPDCCH blind detection attempt ends prior to the time when sPDCCH transmission at next TTI ends. This will be described with reference to the drawings.

Figure 7:
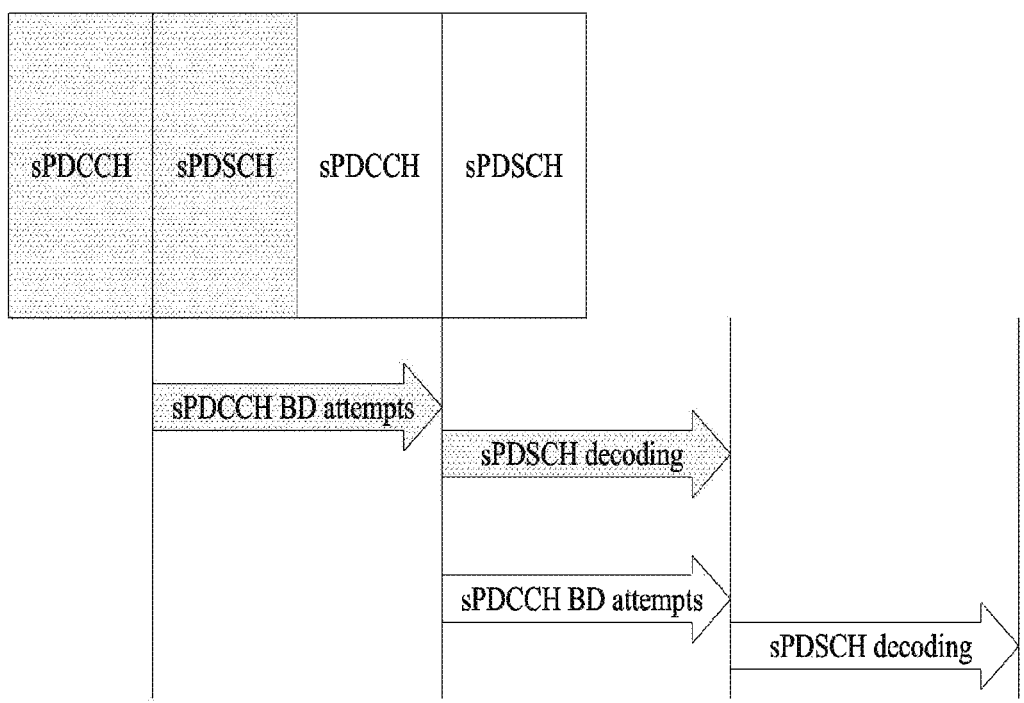
FIGS. 7 and 8 illustrate examples of sPDCCH blind detection attempt end timing point.
Figure 8:
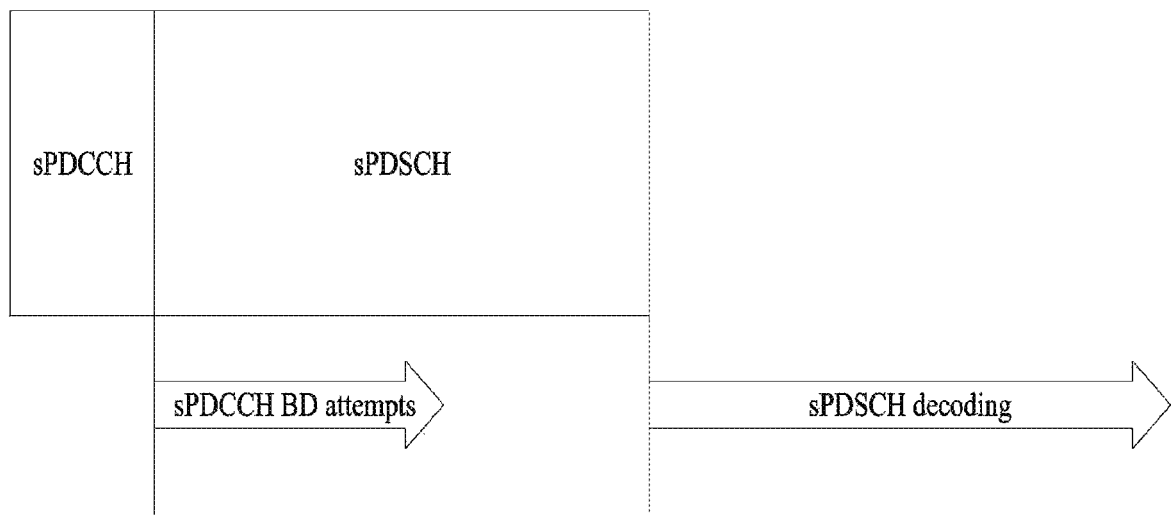

FIGS. 7 and 8 illustrate examples of sPDCCH blind detection attempt end timing point. Particularly, in FIG. 7, the end timing of sPDCCH blind detection attempt is later than sPDSCH transmission end timing. In FIG. 8, the end timing of sPDCCH blind detection attempt is not later than sPDCCH transmission end timing.

Referring to FIGS. 7 and 8, if the end timing of sPDCCH blind detection attempt is later than sPDSCH transmission end timing, a starting position of sPDCCH blind detection attempt at next TTI continues to be delayed, whereby an operation for reducing latency may not be performed normally. This may be affected by the case that a symbol spacing is reduced by scaling of numerology.

For example, it is assumed that data transmission is performed over three symbols. In this case, if an absolute time required for decoding of a control channel is P msec, a corresponding numerology may be assumed, and if three symbols are shorter than P msec, control channel decoding cannot be completed for data transmission. Therefore, decoding of corresponding data may be performed after decoding of control information. Therefore, if the processing time is reduced, or the transmission time is reduced by numerology at a minimum_RTT, it may be assumed that a data transmission burst time is longer than a decoding time of a control channel.

This may determine a minimum transmission burst duration per numerology, or a latency request value for control channel decoding may be set or determined per UE, or may be a value determined in accordance with blind detection attempt times. If this restriction is assumed, it may mean that a minimum size of data is determined per numerology or additional delay should be added to the processing time.

Meanwhile, if the shortened processing time operation is configured in the future-generation wireless communication system, it may be considered that (PHICH-less) asynchronous HARQ process operated without PHICH is applied to uplink transmission. In this case, HARQ process number and/or RV field may be added to DCI that includes an uplink grant. However, in case of DCI corresponding to a common search space (CSS), a previous DCI size may be maintained considering backward compatibility without adding a corresponding field.

Under the circumstances, synchronous uplink HARQ process may be performed for PUSCH scheduled by uplink grant DCI corresponding to CSS regardless of application of the shortened processing time. The uplink HARQ process may be performed with PHICH or may be performed based on an uplink grant without PHICH. In another way, asynchronous uplink HARQ process may be used for a UE for which the shortened processing time operation is configured, regardless of application of the shortened processing time. In this case, it is required to consider additional configuration due to absence of RV field and HARQ process number in CSS DCI. Next, a detailed example of a method for configuring a default for HARQ process number and RV value when an uplink HARQ process for PUSCH scheduled by CSS uplink grant DCI is performed will be described.

The previously configured HARQ process number and RV value are assumed. In more detail, two values may be set to 0. In another way, RV is set to 0, wherein the HARQ process number may be configured by a maximum HARQ process in corresponding configuration (for example, TDD UL-DL configuration, etc.).

The HARQ process number and RV value are respectively set through higher layer signaling.

The HARQ process number is configured through higher layer signaling, and the RV value may be set to a fixed value (for example, 0). In another way, RV may be configured through higher layer signaling, and the HARQ process number may be set to a fixed value (for example, 0 or maximum HARQ process number).

Hereinafter, an example of transmission timing determination according to MCS/TBS will be described.

The transmission timing described hereinafter may be a timing for transmitting an uplink after the UE actually receives a downlink or vice versa, or may indicate a main value. For convenience of description, it is assumed that processing (for example, channel measurement, scheduling, sPDCCH blind detection attempt/encoding, TA, etc.) that does not affect TBS directly is linearly scaled down in accordance with a TTI length. Also, it is assumed that sPDCCH blind detection attempt is completed prior to the end timing of TTI and the end timing of sPDSCH transmission is also equal to the end timing of the TTI. If a scaling level is not linear or assumptions of the end timing are different, a specific offset may be added to or subtracted from the value mentioned in the embodiment of the present invention.

As a detailed embodiment, a main TBS may be configured for a TTI length (based on change in the number of symbols constituting TTI and/or subcarrier spacing change) previously or through a higher layer. For example, when a maximum TBS at a normal TTI is referred to as MAX_TBS, a main TBS for TTI_S may be MAX_TBS*(TTI_S length)/(normal TTI length). For example, in case of one slot TTI, TBS may be MAX_TBS/2.

Next, the transmission timing may be set to 4 TTI for the case that the main TBS is selected. That is, when a main TBS is applied to the case that sPDCCH/sPDSCH is transmitted at TTI # n, a corresponding HARQ-ACK may be transmitted at TTI # n+4. Likewise, when a main TBS is applied to the case that sPDCCH for an uplink grant is transmitted at TTI # n, a corresponding sPUSCH may be transmitted at TTI # n+4. Characteristically, the main TBS may be set to be smaller than MAX_TBS*(TTI_S length)/(normal TTI length) with respect to a TTI comprised of two symbols.

Next, the transmission timing according to the TBS value may use a TBS which will be selected and the main TBS. If the selected TBS becomes smaller than the main TBS, the transmission timing may be shorter than 4 TTI. On the contrary, if the selected TBS becomes greater than the main TBS, the transmission timing may be longer than 4 TTI. In more detail, the transmission timing may be expressed in the form of Ceil(4*(TBS)/(main TBS)) TTI. That is, the transmission timing may be changed in accordance with a ratio between the selected TBS and the main TBS. For another example, the transmission timing may be changed in accordance with a ratio between the number of code blocks for a TBS and the number of code blocks for the main TBS. For example, the transmission timing may be set to Ceil(4*(the number of code blocks for TBS)/(the number of code blocks for the main TBS)) TTI.

As described above, if HARQ-ACK timing is configured differently per UE or status, HARQ-ACK payload size transmitted at one time may be changed flexibly. In this case, a method for avoiding ambiguity for HARQ-ACK payload size between a UE and an eNB may be required. Basically, downlink assignment index (DAI) may be used. In detail, counter DAI (that is, scheduling order or accumulated number) and/or total DAI (that is, a total number of schedulers for transmitting HARQ-ACK) may be used.

However, since it may be inefficient in view of total DAI that scheduling is predicted and prepared at different subframes or TTI in accordance with a scheduler, a different value may be allowed per subframe or TTI. In this case, if the UE fails in detection of some of sPDCCH for transmitting HARQ-ACK at the same time, ambiguity between the UE and the eNB may be avoided using DAI values for front and rear sPDCCH transmission. On the other hand, the UE may fail in detection of sPDCCH corresponding to the last DAI. In this case, blind detection attempt at a receiving end of the eNB may be required in accordance with HARQ-ACK payload size change (and/or in accordance with sPUCCH resource change).

Increase of the blind detection attempt in view of latency reduction may be inefficient. As a part for reducing blind detection attempt, it may be considered that information on HARQ-ACK may be transmitted simultaneously with HACK-ACK. For example, it may be considered that the greatest DAI value for the corresponding HARQ-ACK transmission time at the UE end is transmitted together with HARQ-ACK during HARQ-ACK transmission. To reduce blind detection attempt times, the corresponding information may be subjected to separate coding from HARQ-ACK or UCI. The DAI value may be transmitted from DCI. For example, the DAI value may include 2 bits, each of which may indicate a plurality of DAI values.

As various transmission timings are provided, sPDCCH/sPDSCH transmitted at different subframes or TTIs may transmit HARQ-ACK to different UEs at the same subframe or TTI. Under the circumstances, selection of sPUCCH resource interacting with CCE index for a specific sPDCCH (for example, sPDCCH for the last scheduling) may be inefficient in view of sPDCCH mapping or use of sPUCCH resource. That is, even though different UEs have used sPDCCH corresponding to the same CCE index at different times, collision between two resources should be avoided in accordance with timing configuration during sPUCCH transmission at the same time.

As a simple solution, a method for allocating sPUCCH resource from RRC layer or configuring sPUCCH resource set, and selecting sPUCCH resource which will be used finally through AN Resource Indicator (ARI) of DCI may be considered. Alternatively, sPUCCH resource which will be used finally may be selected by combination sPDCCH transmission position (for example, CCE index and/or frequency resource expressed as PRB index) and offset, such as ARO (AN Resource Offset), transmitted from DCI. Characteristically, the above method may be restricted to be applied to the case that dynamic transmission timing is configured (that is, the case that HARQ-ACK transmission position is changed per timing) In other cases, sPUCCH resource may be selected in accordance with a position to which sPDCCH is transmitted. The sPUCCH resource may basically include an offset signaled through a higher layer.

In another way, sPUCCH resource may be configured based on a default transmission timing. Basically, the default transmission timing may be assumed as a timing used at a generally high probability. Therefore, in view of use in sPUCCH resource, it is required to identify sPUCCH resource for at least default transmission timing from sPUCCH resources for the other timings. For example, sPUCCH resource offset signaled from a higher layer may be configured differently in accordance with the transmission timing, or a third offset may be added.

In detail, sPUCCH resources per CCE index or PRB index for default transmission timing are sequentially stacked in sPUCCH region, and then sPUCCH resources per CCE index or PRB index for the other transmission timings may be stacked continuously or at a constant interval. If a plurality of timings are associated for specific HARQ-ACK transmission, the sPUCCH resource mapping may be performed by dividing the corresponding case into a case of a default transmission timing and the other case. The corresponding case may be divided depending on whether the timing corresponding to sPDCCH used to select sPUCCH resource is the default transmission timing.

More characteristically, if the timing is not the default transmission timing, sPUCCH resource offset may be configured separately per detailed timing. In this method, sPUCCH resource may be configured in accordance with timing information configured in DCI.

Figure 9:
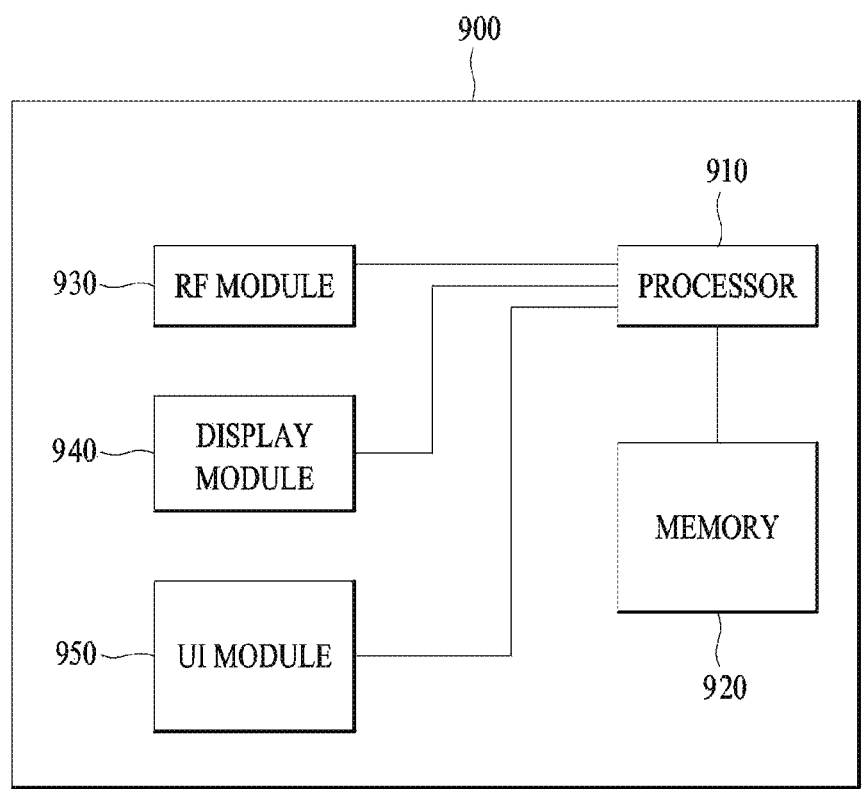
FIG. 9 is a block diagram of a communication apparatus according to an embodiment of the present invention.

FIG. 9 is a block diagram of a communication apparatus according to an embodiment of the present invention.

Referring to FIG. 9, a communication apparatus 900 includes a processor 910, a memory 920, an RF module 930, a display module 940, and a User Interface (UI) module 950.

The communication device 900 is shown as having the configuration illustrated in FIG. 9, for the convenience of description. Some modules may be added to or omitted from the communication apparatus 900. In addition, a module of the communication apparatus 900 may be divided into more modules. The processor 910 is configured to perform operations according to the embodiments of the present invention described before with reference to the drawings. Specifically, for detailed operations of the processor 910, the descriptions of FIGS. 1 to 8 may be referred to.

The memory 920 is connected to the processor 910 and stores an Operating System (OS), applications, program codes, data, etc. The RF module 930, which is connected to the processor 910, upconverts a baseband signal to an RF signal or downconverts an RF signal to a baseband signal. For this purpose, the RF module 930 performs digital-to-analog conversion, amplification, filtering, and frequency upconversion or performs these processes reversely. The display module 940 is connected to the processor 910 and displays various types of information. The display module 940 may be configured as, not limited to, a known component such as a Liquid Crystal Display (LCD), a Light Emitting Diode (LED) display, and an Organic Light Emitting Diode (OLED) display. The UI module 950 is connected to the processor 910 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the signal transmission and reception method for reducing latency in a wireless communication system and the apparatus therefor have been described based on the 3GPP LTE system, the method and the apparatus are applicable to various wireless communication systems in addition to the 3GPP LTE system.

What is claimed is:

1. A method of transmitting an uplink signal to a base station (BS) by a user equipment (UE) in a wireless communication system, the method comprising:
    detecting a downlink control signal from one of a UE specific search space or a common search space at a first subframe; and
    transmitting an uplink signal based on the downlink control signal to the BS at a second subframe,
    wherein the second subframe is determined to be a specific subframe located after 4 subframe from the first subframe based on that the downlink control signal is detected from the common search space, and
    wherein the second subframe is determined to be a subframe located between the first subframe and the specific subframe based on that the downlink control signal is detected from the UE specific search space.

2. The method of claim 1, wherein the uplink signal is a response signal of a downlink data signal scheduled by the downlink control signal or an uplink data signal scheduled by the downlink control signal.

3. The method of claim 1,
wherein the uplink signal is a response signal of a downlink data signal scheduled by the downlink control signal, and
wherein a control channel resource for transmitting the response signal corresponding to the common search space and a control channel resource for transmitting the response signal corresponding to the UE specific search space are determined based on difference offsets.

4. A user equipment (UE) in a wireless communication system, the UE comprising:
a wireless communication unit configured to transmit and receive signals with a base station (BS); and
a processor configured to process the signals,
wherein the processor is configured to:
detect a downlink control signal from one of a UE specific search space or a common search space at a first subframe; and
transmit an uplink signal based on the downlink control signal to the BS at a second subframe,
wherein the processor is further configured to determine the second subframe to be a specific subframe located after 4 subframe from the first subframe based on that the downlink control signal is detected from the common search space, and
wherein the processor is further configured to determine the second to be a subframe located between the first subframe and the specific subframe based on that the downlink control signal is detected from the UE specific search space.

5. The UE of claim 4, wherein the uplink signal is a response signal of a downlink data signal scheduled by the downlink control signal or an uplink data signal scheduled by the downlink control signal.

6. The UE of claim 4,
wherein the uplink signal is a response signal of a downlink data signal scheduled by the downlink control signal, and
wherein a control channel resource for transmitting the response signal corresponding to the common search space and a control channel resource for transmitting the response signal corresponding to the UE specific search space are determined based on difference offsets.

* * * * *